(12) United States Patent
Zeng et al.

(10) Patent No.: US 11,598,917 B2
(45) Date of Patent: Mar. 7, 2023

(54) SILICON NITRIDE PHASED ARRAY CHIP BASED ON A SUSPENDED WAVEGUIDE STRUCTURE

(71) Applicants: Chongqing Institute of East China Normal University, Chongqing (CN); SHANGHAI LANGYAN OPTOELECTRONICS TECHNOLOGY CO., LTD., Shanghai (CN); East China Normal University, Shanghai (CN)

(72) Inventors: Heping Zeng, Chongqing (CN); Jijun Feng, Chongqing (CN); Mengyun Hu, Shanghai (CN); Xiaojun Li, Chongqing (CN); Qinggui Tan, Chongqing (CN); Jinman Ge, Chongqing (CN)

(73) Assignees: Chongqing Institute of East China Normal University, Chongqing (CN); SHANGHAI LANGYAN OPTOELECTRONICS TECHNOLOGY CO., LTD., Shanghai (CN); East China Normal University, Shanghai (CN)

( * ) Notice: Subject to any disclaimer, the term of this patent is extended or adjusted under 35 U.S.C. 154(b) by 37 days.

(21) Appl. No.: 17/337,969

(22) Filed: Jun. 3, 2021

(65) Prior Publication Data
US 2021/0294032 A1    Sep. 23, 2021

(51) Int. Cl.
*G02B 6/12* (2006.01)
*G02B 6/122* (2006.01)
*G02F 1/01* (2006.01)

(52) U.S. Cl.
CPC ..... *G02B 6/12014* (2013.01); *G02B 6/12016* (2013.01); *G02B 6/1228* (2013.01);
(Continued)

(58) Field of Classification Search
CPC .. G02B 6/12; G02B 6/12014; G02B 6/12016; G02B 6/1228; G02B 2006/12061; G02F 1/0147
See application file for complete search history.

(56) References Cited

U.S. PATENT DOCUMENTS 7,539,368 B2 * 5/2009 Hasegawa ............ G02B 6/1203
385/37
10,261,388 B2 * 4/2019 Pruessner ............. G02F 1/2955
(Continued)

FOREIGN PATENT DOCUMENTS

CN   109991582 A   7/2019
CN   209728158 U   12/2019

OTHER PUBLICATIONS

Nicola A .Tyler ,et al .,"SiN integrated optical phased arrays for two-dimensional beam steering at a single near-infrared wavelength ,"Opt .Express 27 ,5851-5858(2019).

*Primary Examiner* — Tina M Wong

(57) ABSTRACT

A silicon nitride phased array chip based on a suspended waveguide structure, which includes a silicon nitride waveguide area and a suspended waveguide area. The silicon nitride waveguide area includes a silicon substrate, a silicon dioxide buffer layer, a silicon dioxide cladding layer and a silicon nitride waveguide-based core layer. The silicon nitride waveguide-based core layer includes an optical splitter unit, a first curved waveguide, a thermo-optic phase shifter and a spot-size converter. The suspended waveguide area includes a second curved waveguide and an array grating antenna.

8 Claims, 8 Drawing Sheets

(52) U.S. Cl.
CPC .... *G02F 1/0147* (2013.01); *G02B 2006/1215* (2013.01); *G02B 2006/12061* (2013.01)

(56) References Cited

U.S. PATENT DOCUMENTS

| | | | |
|---|---|---|---|
| 2004/0067001 A1* | 4/2004 | Vodrahalli | G02B 6/12023 385/11 |
| 2018/0081112 A1* | 3/2018 | Puckett | G10K 11/24 |
| 2021/0294032 A1* | 9/2021 | Zeng | G02B 6/12014 |

* cited by examiner

SILICON NITRIDE PHASED ARRAY CHIP BASED ON A SUSPENDED WAVEGUIDE STRUCTURE

CROSS-REFERENCE TO RELATED APPLICATIONS

This application claims the benefit of priority from Chinese Patent Application No. 202010870062.3, filed on Aug. 26, 2020. The content of the aforementioned application, including any intervening amendments thereto, is incorporated herein by reference in its entirety.

TECHNICAL FIELD

This application relates to integrated photonic chips, and more particularly to a silicon nitride phased array chip based on a suspended waveguide structure at a wavelength of 1550 nm.

BACKGROUND

Silicon-based optoelectronic technology realizes an integration of photonic devices based on the complementary metal-oxide-semiconductor (CMOS) technology, and plays an important role in preparing beam-scanning chips. The silicon based optoelectronic technology has a low cost and high integration accompanying with the advantages of the CMOS technology such as ultra-large-scale logic, ultra-high-precision manufacturing, and ultra-high speed and ultra-low loss. Silicon based photonic technology has been widely studied with the development of the silicon based optoelectronic technology, and is able to integrate thousands of optoelectronic devices on a chip. The silicon based photonic technology can be used to prepare an optic transmitter module, that is, an optical phased array, in a laser radar. Infrared beam-scanning chips made of silicon materials are widely used in lidar systems and optical communication systems, and have the advantages of low loss, high precision, high stability, strong anti-interference, small size and fast scanning.

An optical communication wavelength of the optically-controlled phased-array chip made by the silicon-based optoelectronic technology is about 1550 nm, which is safe for human eyes and facilitates the application of the lidar products in the daily life. In addition, since the silicon-based optoelectronic technology is fully compatible with integrated circuit technology, a beam scanning device and a control integrated circuit can be integrated on a single chip at the same time, which is conducive to realizing the intelligent control and neural network integration.

The optical phased array is a beam steering technology. The laser enters an optical waveguide array through an optical beam splitter, and a phase of the light wave is changed on the waveguide by an external control, and then the light wave phase difference between the waveguides is used to achieve the beam scanning. This principle is similar to multi-slit interference. Each waveguide in the optical waveguide array is equivalent to a slit in the multi-slit interference. The light propagates and interferes in space, and then is concentrated in one direction due to interference enhancement and weakened in other directions due to destructive interference, such that the propagation direction of the light is changed to achieve the scanning.

One-dimensional scanning of the phased array is usually achieved in two manners. In the first method, the beam scanning is performed using thermo-optic phase modulation. This method only needs a monochromatic laser source, and has a large scanning angle. However, it is required to integrate an electrode on the chip, increasing the operation complexity. The second approach is to use wavelength to achieve the beam scanning. However, this method requires a tunable laser source, and has a small scanning angle.

As a new material for the photonic platform, silicon nitride has excellent optoelectronic, insulating and mechanical properties, and is thus widely used in optoelectronics and microelectronics integration. The silicon nitride optical waveguide has a desirable core-cladding refractive index difference, small size, high integration and high performance stability. Compared to the current silicon-on-insulator (SOI) technology, the silicon nitride optical waveguide has simple production, low cost, and a wide transmission spectrum ranging from visible light to infrared light. The visible light phased array has been used in visual imaging and biofluorescence detection. The silicon nitride waveguide optical devices such as micro-ring resonators, grating couplers and beam splitters have attracted worldwide attention due to the excellent properties of silicon nitride. The silicon nitride waveguide platform can also be used for phased array beam deflection (Nicola A. Tyler, et al., SiN integrated optical phased arrays for two-dimensional beam steering at a single near-infrared wavelength. *Opt. Express* 27, 5851-5858 (2019)).

However, due to the limitation of the refractive index difference between the silicon nitride core layer and the silicon oxide cladding layer, when the distance between the waveguide array elements is small, adjacent waveguides are prone to crosstalk, deteriorating the far-field outgoing beam. Therefore, the current silicon nitride phased array beam-deflecting chips usually have a large distance between the waveguide array elements, but this design renders the side lobes close to the main peak, limiting the beam scanning range. How to reduce the crosstalk between the small-pitched array elements of silicon nitride waveguide and improve the scanning range of the far-field beam still remain unsolved in the application field of silicon nitride phased array chips.

SUMMARY

An objective of the present disclosure is to provide a silicon nitride phased array chip based on a suspended waveguide structure, so as to realize a uniform beam splitting of a light having a wavelength of 1550 nm and a beam scanning with a wide field of view and large scanning angle. The large scanning angle requires a large distance between grating lobes of a grating outgoing antenna and small distance between array element antennas, so as to deflect a beam with an angle of ±45°. A distance between adjacent silicon nitride straight waveguides provided herein is small, and in order to prevent a crosstalk between the waveguides caused by a too small distance between array elements and realize a large-angle beam scanning, the present disclosure adopts the following technical solutions.

A silicon nitride phased array chip based on a suspended waveguide structure, comprising:
a silicon nitride waveguide area; and
a suspended waveguide area;
wherein the silicon nitride waveguide area comprises a silicon substrate, a silicon dioxide buffer layer, a silicon dioxide cladding layer and a silicon nitride waveguide-based core layer; the silicon nitride waveguide-based core layer comprises an optical splitter unit, a first curved waveguide, a thermo-optic phase shifter and a spot-size converter;

the suspended waveguide area comprises a second curved waveguide and an array grating antenna; the optical splitter unit, the first curved waveguide, the thermo-optic phase shifter and the spot-size converter are arranged on the silicon dioxide buffer layer and in the silicon dioxide cladding layer; and a light beam with a wavelength of 1550 nm sequentially passes through the optical splitter unit, the first curved waveguide, the thermo-optic phase shifter, the spot-size converter, the second curved waveguide and the array grating antenna.

In some embodiments, the optical splitter unit comprises a plurality of beam splitters based on silicon nitride waveguide; a working wavelength of each of the plurality of beam splitters is 1550 nm; the plurality of beam splitters comprise one input 1×2 beam splitter, two 1×2 beam splitters and four output 1×2 beam splitters; the four output 1×2 beam splitters are connected in parallel; the one input 1×2 beam splitter is connected in series with the four output 1×2 beam splitters; and each of the plurality of beam splitters is provided with one input port and two output ports.

In some embodiments, each of the plurality of beam splitters comprises an input section, a multimode interference couple section and an output section connected in sequence;

the input section comprises an input straight waveguide section and an input tapered waveguide section connected to the input straight waveguide section; a larger end of the input tapered waveguide section is connected to the multimode interference couple section; and the output section comprises two output tapered waveguide sections and two output straight waveguide sections connected to the two output tapered waveguide sections, respectively; and a larger end of each of the two output tapered waveguide sections is connected to the multimode interference coupling section.

In some embodiments, a width of the multimode interference couple section is 10 μm; a length of the multimode interference couple section is 58.4 μm;

a center wavelength of the working wavelength of each of the plurality of beam splitters is 1550 nm; and within a manufacturing tolerance, an output power of each of the two output ports of each of the plurality of beam splitters is greater than 49.5%;

a length of the input tapered waveguide section is 2.5 μm; a width of the larger end of the input tapered waveguide section is 2.5 μm; a width of a smaller end of the input tapered waveguide section with is 2 μm; a width of the input straight waveguide section is 2 μm; a length of the input straight waveguide section is 10 μm; a width of each of the two output straight waveguide sections is 2 μm; a length of each of the two output straight waveguide sections is 10 μm; a distance between the two output straight waveguide sections is 2.5 μm; a width of the larger end of each of the two output tapered waveguide sections is 2.5 μm; a width of a smaller end of each of the two output tapered waveguide sections is 2 μm; a length of each of the two output tapered waveguide sections is 2.5 μm; and a thickness of each of the plurality of beam splitters is 700 nm.

In some embodiments, the thermo-optic phase shifter is a metal heater; and the thermo-optic phase shifter is arranged on an output channel of the optical splitter unit.

In some embodiments, the array grating antenna comprises five silicon nitride straight waveguides arranged spaced apart in parallel with a distance of 1.2 μm; the five silicon nitride straight waveguides sequentially have a width of 0.6 μm, 0.8 μm, 1.0 μm, 0.6 μm and 0.8 μm; the five silicon nitride straight waveguides each have a length of 100 μm and a thickness of 0.7 μm; and the five silicon nitride straight waveguides are suspendedly supported on the silicon dioxide buffer layer respectively through a silicon dioxide support; a width of the silicon dioxide support is the same as that of a silicon nitride straight waveguide supported thereon; a thickness of the silicon dioxide support is 0.2 μm; a distance between adjacent silicon dioxide supports is 1.2 μm; and the five silicon nitride straight waveguides are surrounded by an air medium.

In some embodiments, a thickness of the silicon dioxide cladding layer is 2 μm; and a thickness of the silicon dioxide buffer layer is 2 μm.

In some embodiments, the silicon nitride phased array chip deflects the light beam by ±45°.

The beneficial effects of the present disclosure are described as follows.

(1) A silicon nitride phased array chip based on a suspended waveguide structure provided herein is small in size, and has a compact structure, simple preparation, high yield and a large manufacturing tolerance.

(2) A working wavelength of the chip ranges from visible to infrared band, which is safe for human eyes, facilitating promoting the application of the lidar products in the daily life.

(3) The chip of the disclosure enables the uniform splitting, phase modulation and beam scanning of the optical beam with a wavelength of 1550 nm, and can deflect the optical beam by ±45°.

DETAILED DESCRIPTION OF EMBODIMENTS

The present disclosure will be further described below with reference to the embodiment(s) and the accompanying drawing(s). A silicon nitride phased array chip based on a suspended waveguide structure is provided in this embodiment, and this embodiment is not intended to limit this disclosure. Modifications and variations made without departing from the spirit of this disclosure should fall within the scope of the present disclosure defined by the appended claims.

(1) Chip Design

In a design of the silicon nitride phased array chip based on the suspended waveguide structure, a light source having a wavelength of 1550 nm passes through a silicon nitride beam splitter and arrives at an array grating antenna, so as to scan with wide field of view.

For the silicon nitride beam splitter, a straight waveguide having a width of 10 μm is selected at a wavelength of 1550 nm. Through a simulation using a software Lumerical FDTD Solutions, a multimode interference length of the beam splitter is obtained as 58.4 μm. A length of an input tapered waveguide is 2.5 μm. A lager end of the input tapered waveguide section has a width of 2.5 μm, and a small end of the input tapered waveguide section has a width of 2 μm. Output tapered waveguides have a length of 2.5 μm. A larger end of the output tapered waveguide section has a width of 2.5 μm, and a small end of the output tapered waveguide section has a width of 2 μm. A distance between the output tapered waveguides is 2.5 μm For the array grating antenna, five silicon nitride (SiN) straight waveguides respectively with a width of 0.6 μm, 0.8 μm, 1.0 μm, 0.6 μm and 0.8 μm are selected, and the five silicon nitride straight waveguides each have a length of 100 μm and a thickness of 0.7 μm. The five silicon nitride straight waveguides are spaced apart with a distance of 1.2 μm. Each of the five silicon nitride straight waveguides is supported by a silicon dioxide post on a silicon dioxide buffer layer in a T-shaped structure. The silicon nitride straight waveguides are surrounded by an air medium. The five silicon dioxide posts have a thickness of 0.2 μm and a length of 2 μm. Widths of the five silicon dioxide posts are 0.6 μm, 0.8 μm, 1.0 μm, 0.6 μm and 0.8 μm, respectively. A distance between two adjacent silicon dioxide posts is 1.2 μm. The simulation software of Lumerical FDTD Solutions is used to simulate field distribution diagrams of a light respectively emitted from the center of straight waveguides having widths of 0.6 μm, 0.8 μm and 1.0 μm at a wavelength of 1550 nm. No obvious interference can be found in the field distribution diagrams, proving that the supported structure prevents the coupling between adjacent straight waveguides.

Figure 1:
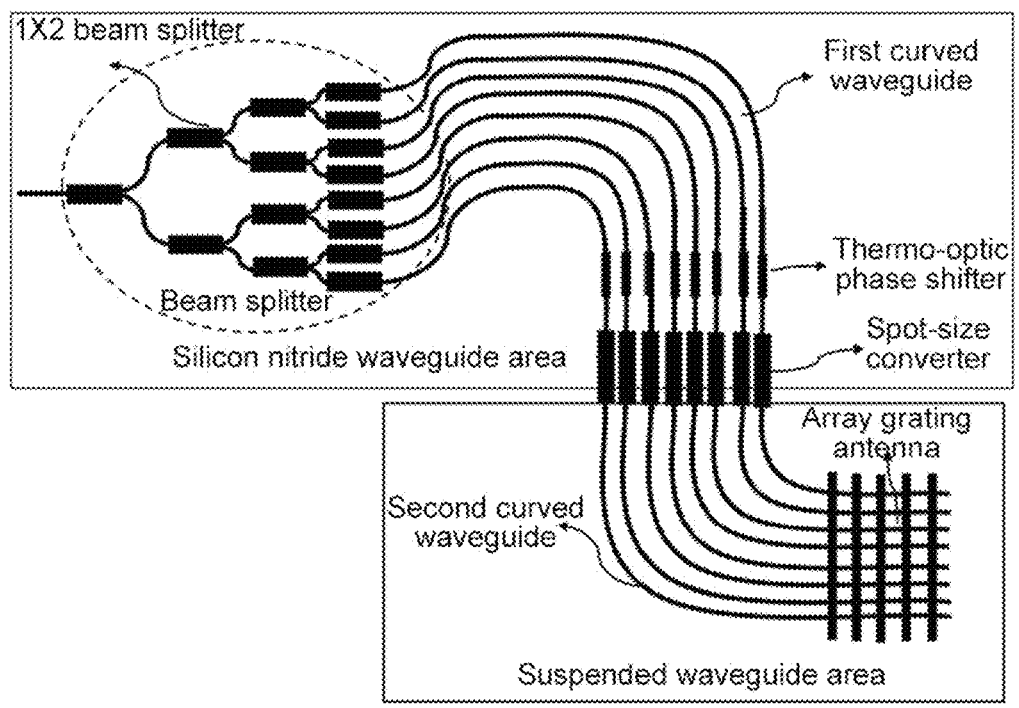
FIG. 1 schematically depicts a structure of a silicon nitride phased array chip based on a suspended waveguide structure in accordance with an embodiment of the present disclosure.

FIG. 1 shows the silicon nitride phased array chip based on the suspended waveguide structure, which includes a silicon substrate, the silicon dioxide buffer layer, a silicon dioxide cladding layer, a silicon nitride waveguide-based core layer and a suspended waveguide area based on silicon nitride. The silicon nitride waveguide-based core layer includes a beam splitter, a first curved waveguide, a thermo-optic phase shifter and a spot-size converter. The suspended waveguide area includes a second curved waveguide and the array grating antenna.

Figure 2:
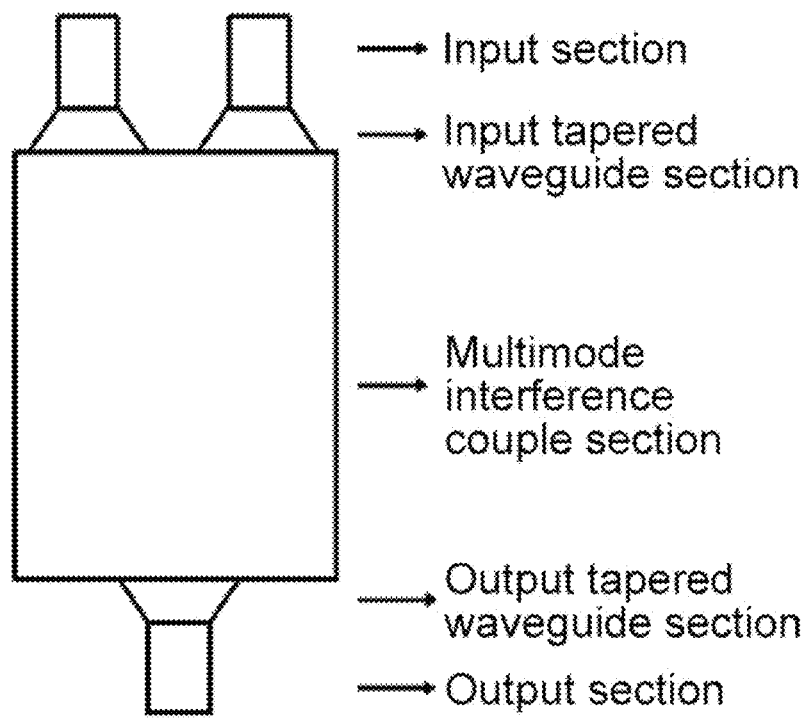
FIG. 2 schematically depicts a structure of a beam splitter in accordance with an embodiment of the present disclosure.

FIG. 2 schematically depicts a structure of the silicon nitride beam splitter. The silicon nitride beam splitter includes an input section, a multimode interference couple section and an output section connected in sequence. In this embodiment, the structures of an input beam splitter and parallel output beam splitters have the same structure.

In order to optimize an optical coupling of an input beam and an output beam and improve a working efficiency and performance of the beam splitter, the input section and the output section have a tapered structure at the junction of the multimode interference coupling section. The tapered structure can effectively improve a splitting ratio and reduce an insertion loss.

Figure 3:
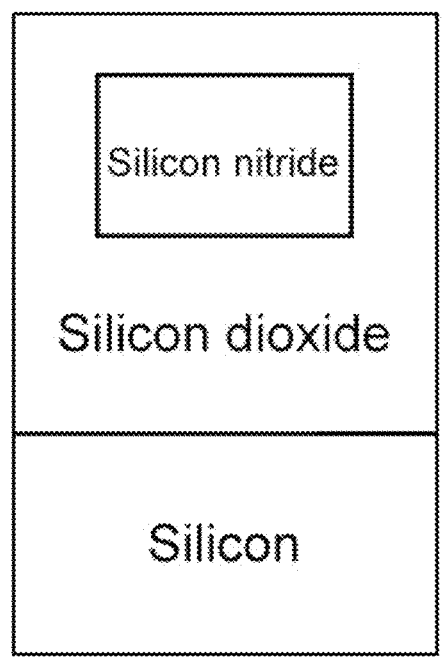
FIG. 3 schematically depicts a structure of a silicon nitride waveguide area in accordance with an embodiment of the present disclosure.

FIG. 3 schematically depicts a cross-sectional view of the silicon nitride beam splitter. A thickness of the silicon nitride waveguide is 700 nm. The silicon nitride waveguide is covered by the silicon dioxide cladding layer on the silicon dioxide buffer layer, and the silicon dioxide buffer layer is arranged on the silicon substrate.

Figure 4:
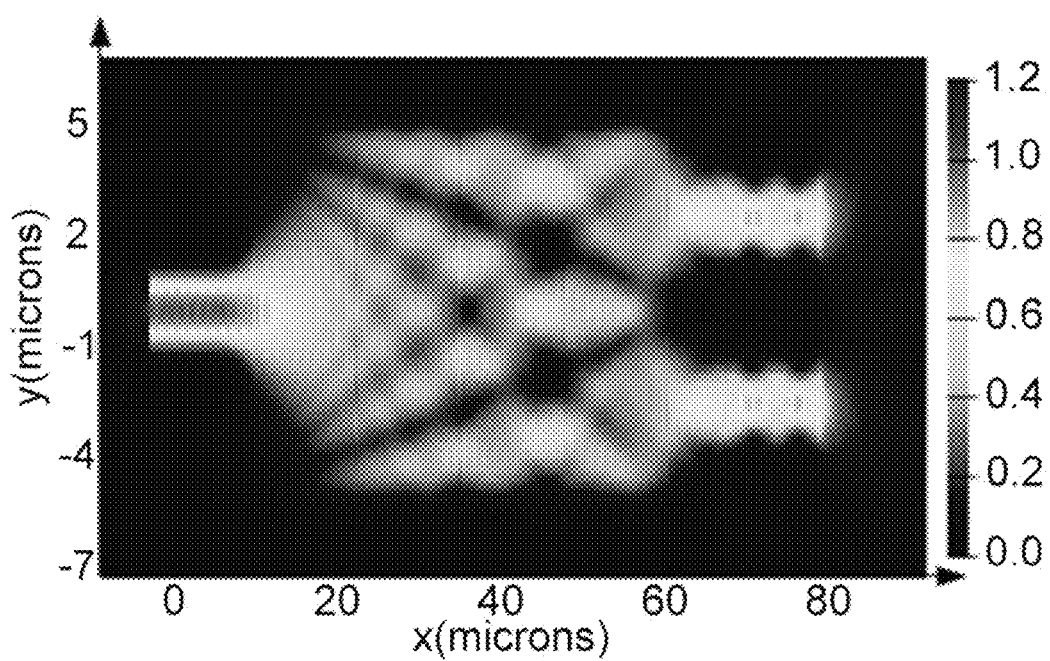
FIG. 4 is a field distribution diagram of transmission of a light beam with a center wavelength of 1550 nm in the beam splitter obtained by using a simulation software Lumerical FDTD Solutions based on a finite difference time domain (FDTD) method.

FIG. 4 is a field distribution diagram of transmission of a light beam with a center wavelength of 1550 nm in the beam splitter obtained by using a simulation software Lumerical FDTD Solutions.

Figure 5:
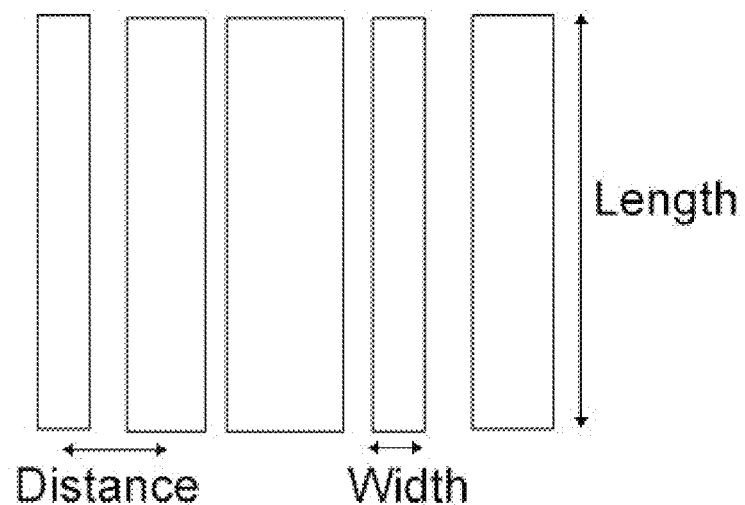
FIG. 5 schematically depicts a structure of an array grating antenna in accordance with an embodiment of the present disclosure.

FIG. 5 schematically depicts a structure of the arrayed rating antenna. The arrayed rating antenna includes straight silicon nitride waveguides arranged in parallel.

Figure 6:
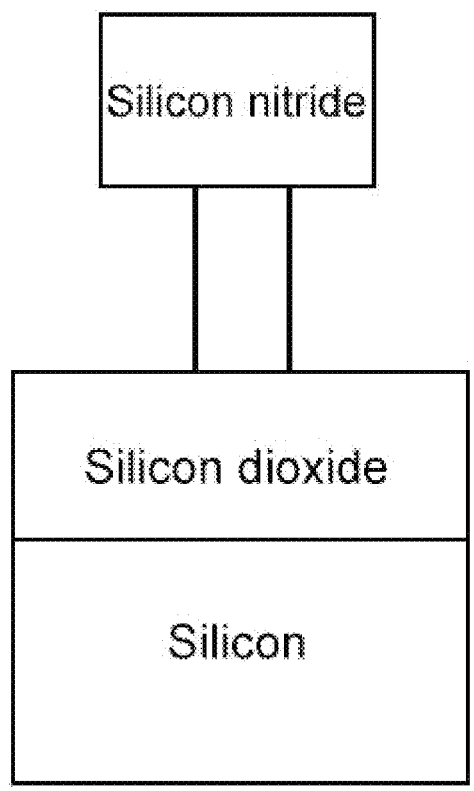
FIG. 6 is a cross-sectional view of the array grating antenna in accordance with an embodiment of the present disclosure.

FIG. 6 is a cross-sectional view of the array grating antenna. A thickness of the silicon nitride waveguide is 700 nm. A cladding layer is air, and the silicon nitride waveguide is supported on the silicon dioxide buffer layer in a T-shaped structure to avoid collapse. The silicon dioxide buffer layer is arranged on the silicon substrate.

Figure 7A:
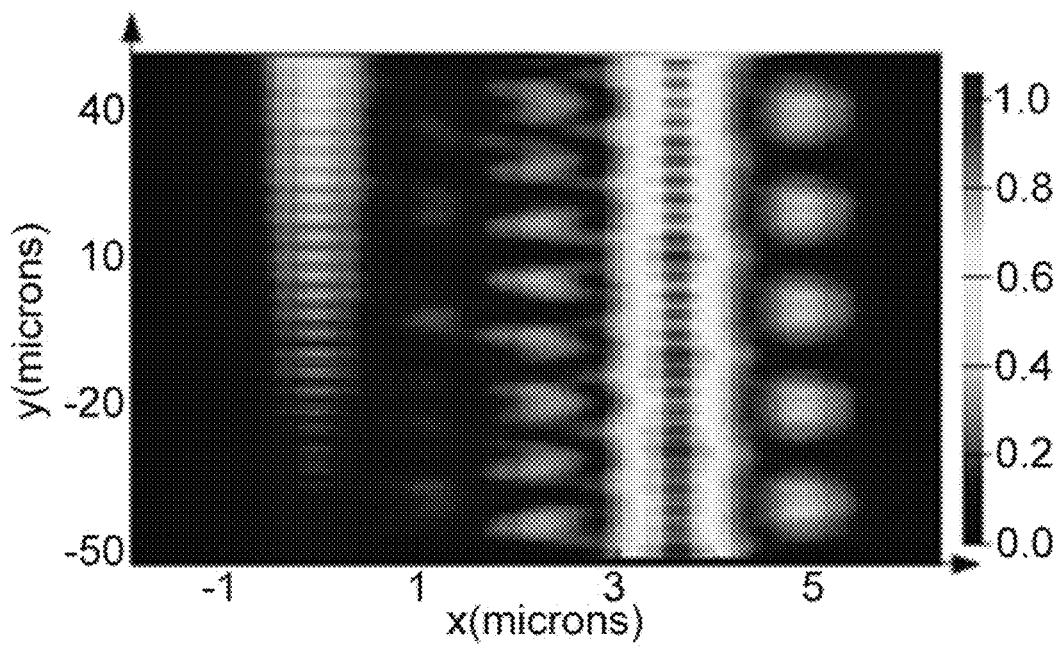
FIGS. 7A-7C are field distribution diagrams of a light beam with a center wavelength of 1550 nm transmitted from a waveguide with a width of 0.6 μm, 0.8 μm and 1.0 μm respectively without using the suspended waveguide structure; where the field distribution diagrams are obtained by using the simulation software Lumerical FDTD Solutions based on the FDTD method.
Figure 7B:
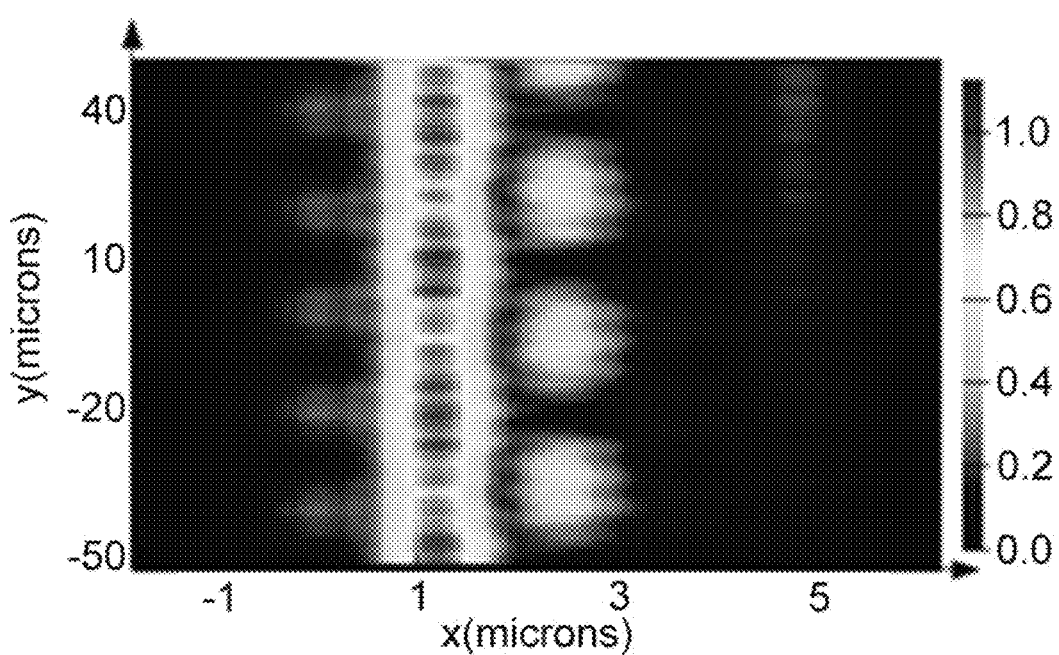
Figure 7C:
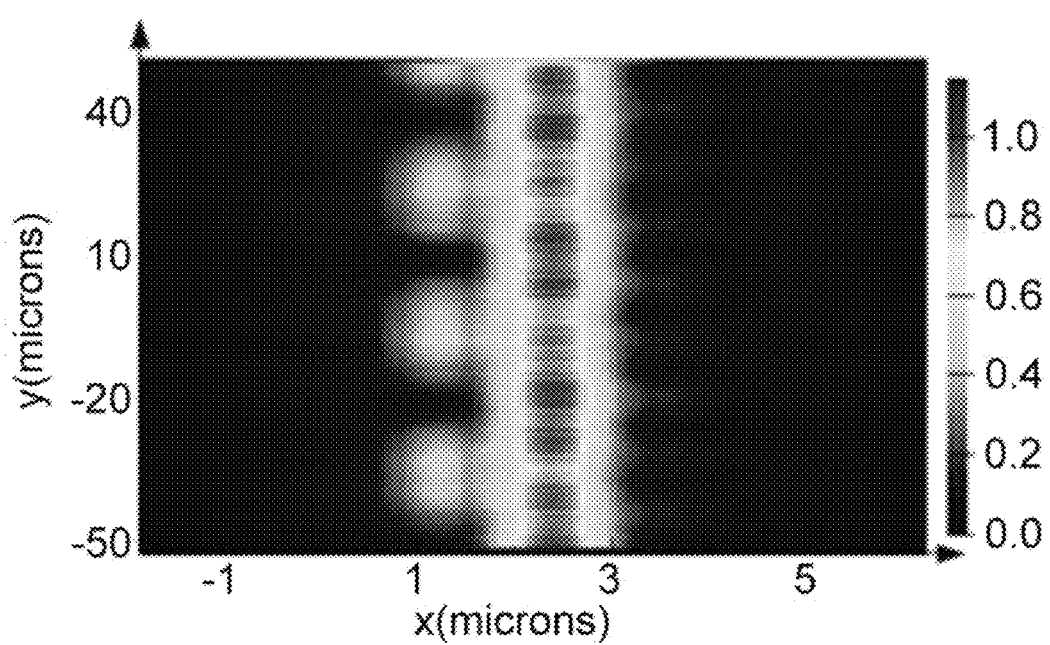

FIGS. 7A-7C are field distribution diagrams of a light beam with a center wavelength of 1550 nm transmitted from a waveguide with a width of 0.6 μm, 0.8 μm and 1.0 μm respectively without using the suspended waveguide structure; where the field distribution diagrams are obtained by using the simulation software Lumerical FDTD Solutions.

Figure 8A:
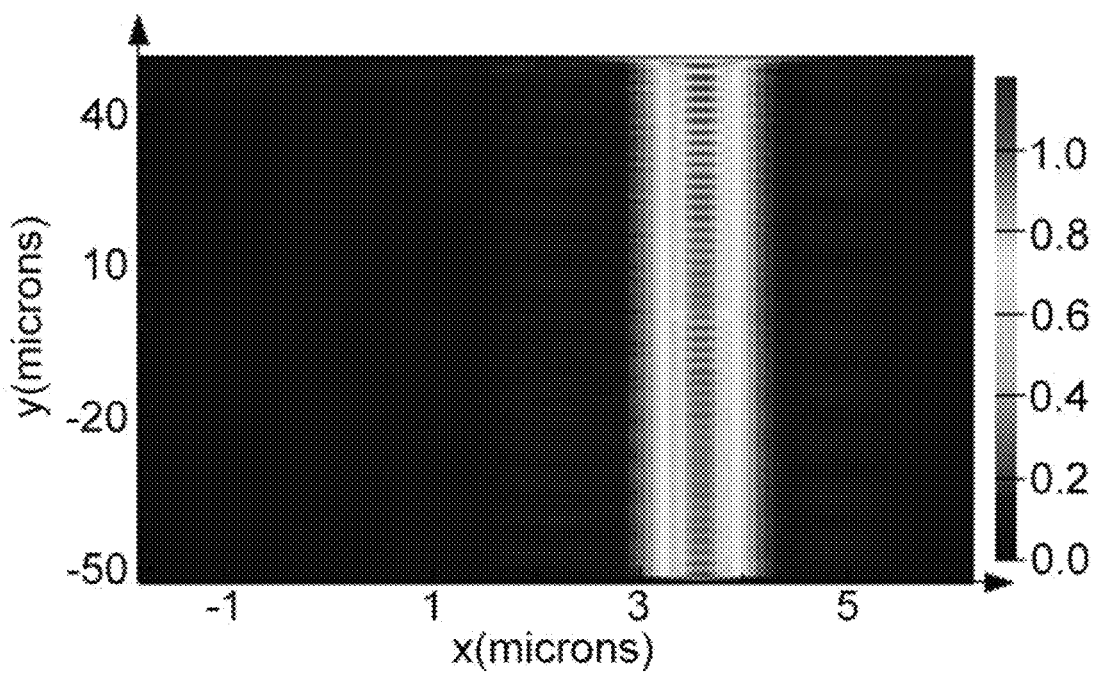
FIGS. 8A-8C are field distribution diagrams of a light beam with a center wavelength of 1550 nm transmitted from a waveguide with a width of 0.6 μm, 0.8 μm and 1.0 μm respectively using the suspended waveguide structure; where the field distribution diagrams are obtained by using the simulation software Lumerical FDTD Solutions based on the FDTD method.
Figure 8B:
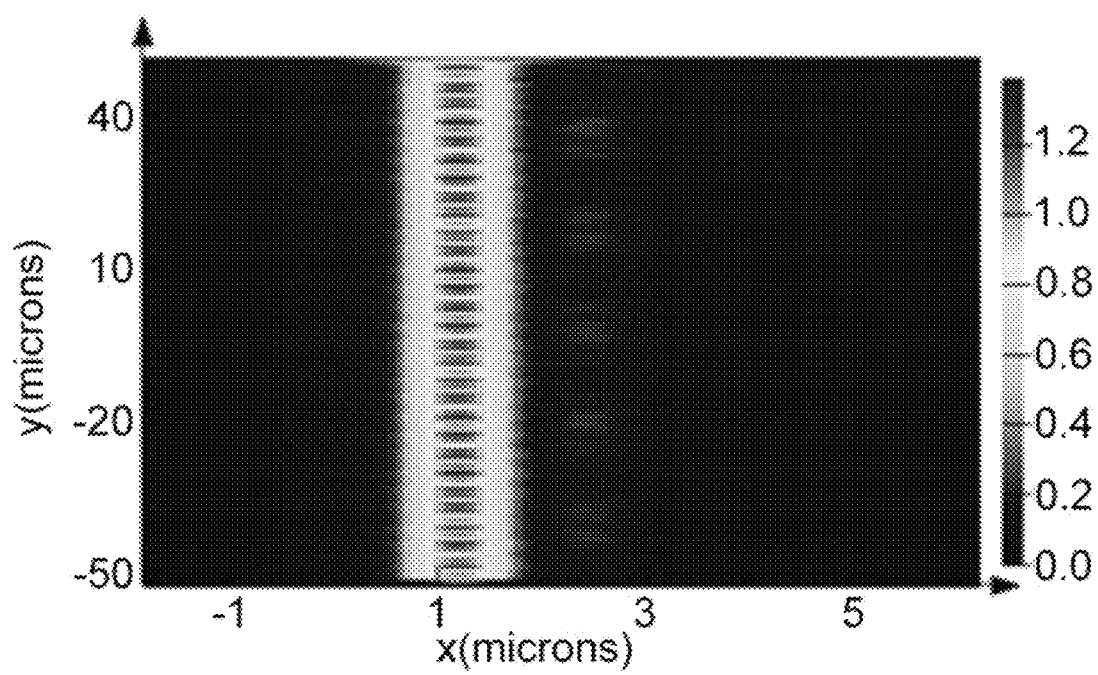
Figure 8C:
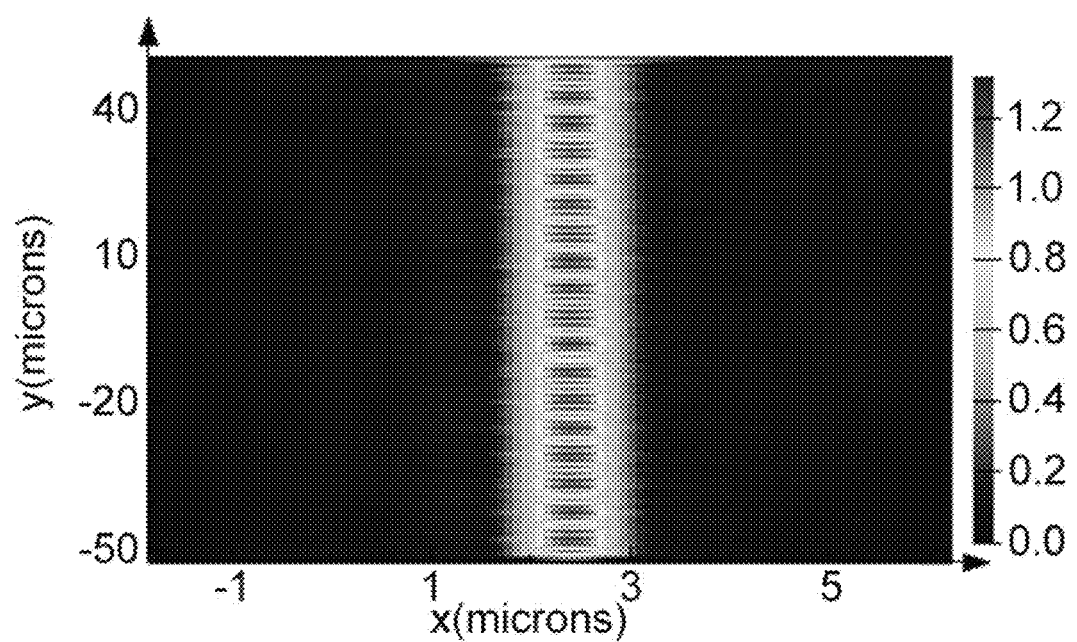

FIGS. 8A-8C are field distribution diagrams of a light beam with a center wavelength of 1550 nm transmitted from a waveguide with a width of 0.6 μm, 0.8 μm and 1.0 μm respectively using the suspended waveguide structure; where the field distribution diagrams are obtained by using the simulation software Lumerical FDTD Solution.

Figure 9:
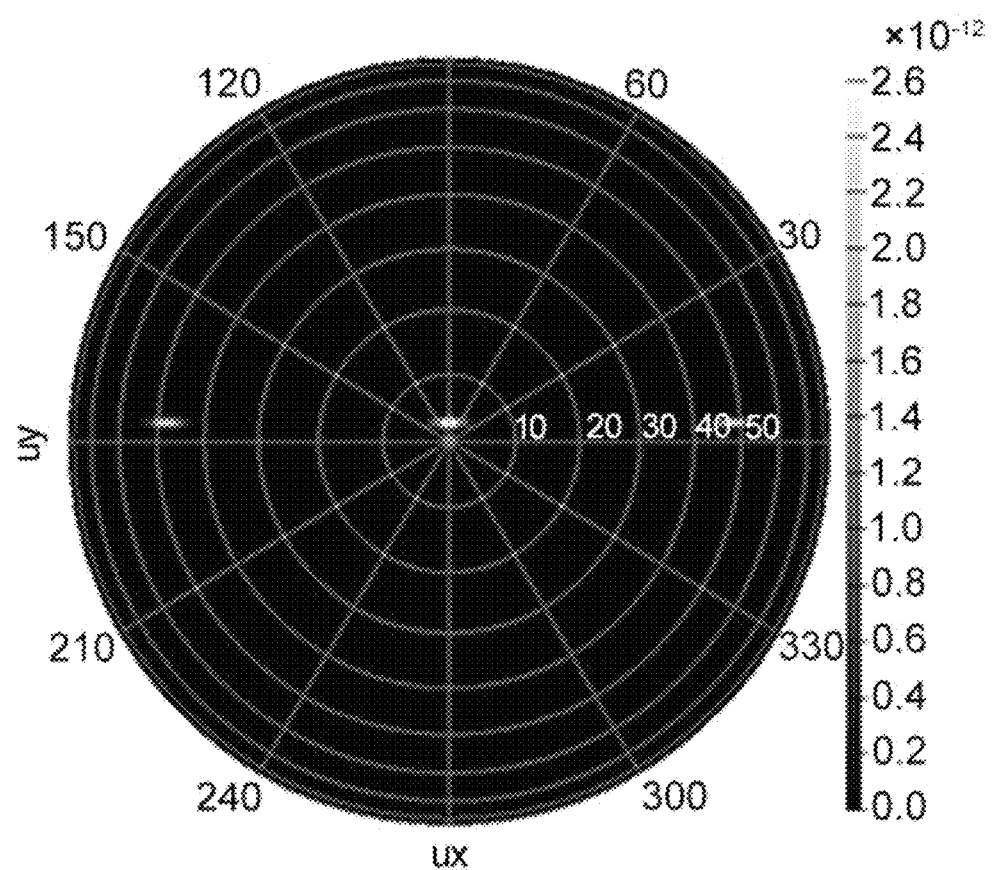
FIG. 9 is a far-field beam scanning range image obtained by using the simulation software Lumerical FDTD Solutions based on the FDTD in accordance with an embodiment of the present disclosure.
Figure 10:
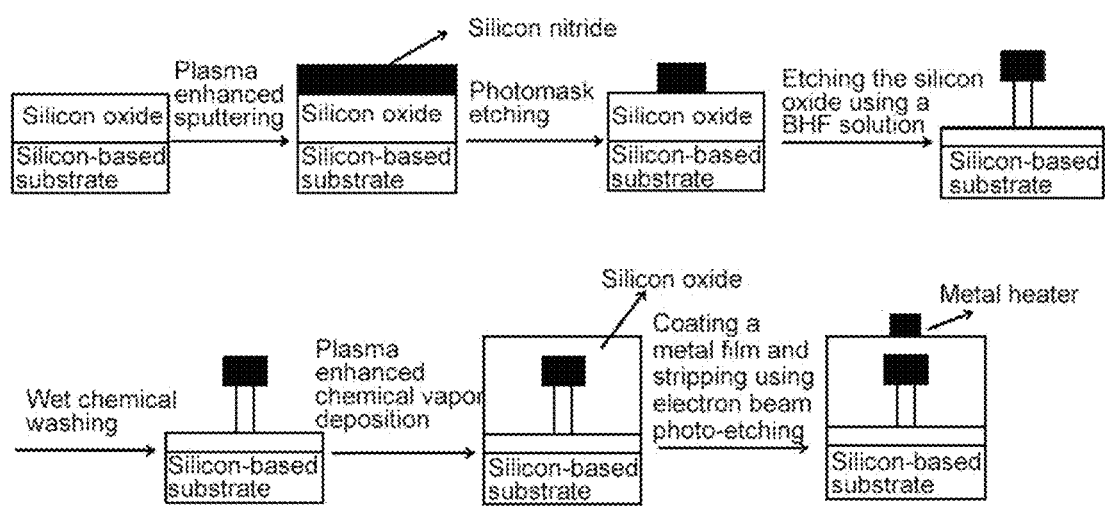
FIG. 10 schematically depicts a manufacturing flow chart of the silicon nitride phased array chip based on the suspended waveguide structure for a light beam with a wavelength of 1550 nm in accordance with an embodiment of the present disclosure.

FIG. 9 is a far-field beam scanning range image obtained by using the simulation software Lumerical FDTD Solutions. The silicon nitride phased array chip deflects the light beam by ±45°.

The final designed silicon nitride phased array chip based on the suspended waveguide structure can uniformly split a beam having a wavelength at 1550 nm and realize a wide field of view scanning. The chip is based on silicon nitride, and can work in the visible to infrared light range. With respect to a visible light phased array, it can be used in fields such as video imaging and biofluorescence detection.

(2) Chip Production

The silicon dioxide buffer layer having a thickness of 2 μm is formed on the silicon substrate through plasma enhanced chemical vapor deposition at 350° C.

A resist is coated on the silicon dioxide buffer layer as a photomask for the silicon nitride photonic circuit, and a silicon nitride layer having a thickness of 700 nm is deposited on the silicon dioxide buffer layer by plasma enhanced sputtering. The silicon nitride waveguide with a flat surface is obtained through electron beam photo-etching and plasma etching, and an etching depth is monitored in real time. Then, the sample is subjected to an etching to remove the silicon dioxide, in which ammonia fluoride is added to the HF etching solution as a buffer to form the etching solution BHF, so as to remove the silicon dioxide on the surface of the silicon waveguide and a part of the silicon dioxide on the bottom of the silicon nitride.

With respect to the chip unit, the sample is cleaned by a wet chemical process to remove surface impurities. A silicon dioxide upper cladding layer with a thickness of 2 μm is formed through plasma-enhanced chemical vapor deposition. With respect to the T-shaped structure of the waveguide, the silicon nitride waveguide is deposited on the silicon dioxide post, and a cladding layer is air. Then a Ti/Pt heater is attached to an output channel of the output beam splitter through photoresist drying process and stripping technology, and a back of the Ti/Pt heater is polished and cut for performance characterization.

The above-mentioned embodiments are preferred embodiments, and are illustrative of the present disclosure. It should be understood that variations and modifications made by those skilled in the art without departing from the spirit of this disclosure should fall within the scope of the present disclosure defined by the appended claims.

What is claimed is:

1. A silicon nitride phased array chip based on a suspended waveguide structure, comprising:
    a silicon nitride waveguide area; and
    a suspended waveguide area;
    wherein the silicon nitride waveguide area comprises a silicon substrate, a silicon dioxide buffer layer, a silicon dioxide cladding layer and a silicon nitride waveguide-based core layer; the silicon nitride waveguide-based core layer comprises an optical splitter unit, a first curved waveguide, a thermo-optic phase shifter and a spot-size converter; the suspended waveguide area comprises a second curved waveguide and an array grating antenna; the optical splitter unit, the first curved waveguide, the thermo-optic phase shifter and the spot-size converter are arranged on the silicon dioxide buffer layer and in the silicon dioxide cladding layer; and
    a light beam with a wavelength of 1550 nm sequentially passes through the optical splitter unit, the first curved waveguide, the thermo-optic phase shifter, the spot-size converter, the second curved waveguide and the array grating antenna.

2. The silicon nitride phased array chip of claim 1, wherein the optical splitter unit comprises a plurality of beam splitters based on silicon nitride waveguide; a working wavelength of each of the plurality of beam splitters is 1550 nm; the plurality of beam splitters comprise one input 1×2 beam splitter, two 1×2 beam splitters and four output 1×2 beam splitters; the four output 1×2 beam splitters are connected in parallel; the one input 1×2 beam splitter is connected in series with the four output 1×2 beam splitters; and each of the plurality of beam splitters is provided with one input port and two output ports.

3. The silicon nitride phased array chip of claim 2, wherein each of the plurality of beam splitters comprises an input section, a multimode interference couple section and an output section connected in sequence;
    the input section comprises an input straight waveguide section and an input tapered waveguide section connected to the input straight waveguide section; a larger end of the input tapered waveguide section is connected to the multimode interference couple section; and
    the output section comprises two output tapered waveguide sections and two output straight waveguide sections connected to the two output tapered waveguide sections, respectively; and a larger end of each of the two output tapered waveguide sections is connected to the multimode interference coupling section.

4. The silicon nitride phased array chip of claim 3, wherein a width of the multimode interference couple section is 10 μm; a length of the multimode interference couple section is 58.4 μm;
    a center wavelength of the working wavelength of each of the plurality of beam splitters is 1550 nm; and within a manufacturing tolerance, an output power of each of the two output ports of each of the plurality of beam splitters is greater than 49.5%; and
    a length of the input tapered waveguide section is 2.5 μm; a width of the larger end of the input tapered waveguide section is 2.5 μm; a width of a smaller end of the input tapered waveguide section with is 2 μm; a width of the input straight waveguide section is 2 μm; a length of the input straight waveguide section is 10 μm; a width of each of the two output straight waveguide sections is 2 μm; a length of each of the two output straight waveguide sections is 10 μm; a distance between the two output straight waveguide sections is 2.5 μm; a width of the larger end of each of the two output tapered waveguide sections is 2.5 μm; a width of a smaller end of each of the two output tapered waveguide sections is 2 μm; a length of each of the two output tapered waveguide sections is 2.5 μm; and a thickness of each of the plurality of beam splitters is 700 nm.

5. The silicon nitride phased array chip of claim 1, wherein the thermo-optic phase shifter is a metal heater; and the thermo-optic phase shifter is arranged on an output channel of the optical splitter unit.

6. The silicon nitride phased array chip of claim 1, wherein the array grating antenna comprises five silicon nitride straight waveguides arranged spaced apart in parallel with a distance of 1.2 μm; the five silicon nitride straight waveguides sequentially have a width of 0.6 μm, 0.8 μm, 1.0 μm, 0.6 μm and 0.8 μm; the five silicon nitride straight waveguides each have a length of 100 μm and a thickness of 0.7 μm; and
    the five silicon nitride straight waveguides are suspendedly supported on the silicon dioxide buffer layer respectively through a silicon dioxide support; a width of the silicon dioxide support is the same as that of a silicon nitride straight waveguide supported thereon; a thickness of the silicon dioxide support is 0.2 μm; a distance between adjacent silicon dioxide supports is 1.2 μm; and the five silicon nitride straight waveguides are surrounded by an air medium.

7. The silicon nitride phased array chip of claim 1, wherein a thickness of the silicon dioxide cladding layer is 2 μm; and a thickness of the silicon dioxide buffer layer is 2 μm.

8. The silicon nitride phased array chip of claim 1, wherein the silicon nitride phased array chip deflects the light beam by ±45°.

* * * * *